US010358003B2

(12) United States Patent
Lust

(10) Patent No.: US 10,358,003 B2
(45) Date of Patent: Jul. 23, 2019

(54) RUNFLAT DEVICE AND FITTING METHOD

(71) Applicant: RUN FLAT SYSTEMS LIMITED, Sheffield (GB)

(72) Inventor: Richard Lust, Buckinghamshire (GB)

(73) Assignee: RUN FLAT SYSTEMS LIMITED, Brunei Way, Sheffield (GB)

(*) Notice: Subject to any disclaimer, the term of this patent is extended or adjusted under 35 U.S.C. 154(b) by 761 days.

(21) Appl. No.: 14/768,647

(22) PCT Filed: Feb. 19, 2014

(86) PCT No.: PCT/GB2014/050485
§ 371 (c)(1),
(2) Date: Aug. 18, 2015

(87) PCT Pub. No.: WO2014/128461
PCT Pub. Date: Aug. 28, 2014

(65) Prior Publication Data
US 2016/0001610 A1    Jan. 7, 2016

(30) Foreign Application Priority Data

Feb. 20, 2013  (GB) .................................. 1303023.4

(51) Int. Cl.
*B60C 17/00*   (2006.01)
*B60C 17/04*   (2006.01)

(52) U.S. Cl.
CPC .......... *B60C 17/041* (2013.01); *B60C 17/044* (2013.01)

(58) Field of Classification Search
CPC ....... B60C 17/00; B60C 17/04; B60C 17/041; B60C 17/042
See application file for complete search history.

(56) References Cited

U.S. PATENT DOCUMENTS

| | | | |
|---|---|---|---|
| 4,216,810 A | 8/1980 | Osada et al. |
| 4,263,953 A | 4/1981 | Miceli |
| 4,293,016 A | 10/1981 | Bible et al. |
| 5,215,137 A | 6/1993 | Weeks et al. |
| 6,681,822 B2 | 1/2004 | Adams et al. |

(Continued)

FOREIGN PATENT DOCUMENTS

| | | | |
|---|---|---|---|
| EP | 798141 | * | 10/1997 |
| GB | 2238276 A | | 5/1991 |

(Continued)

OTHER PUBLICATIONS

Office Action dated Jun. 13, 2016 for U.S. Appl. No. 14/860,176, 12 pages.
Australian Examination Report dated Mar. 21, 2017 for AU Patent Application No. 2014220485, 3 pages.
Office Action dated May 18, 2017 for U.S. Appl. No. 14/860,176, 10 pages.

(Continued)

*Primary Examiner* — Justin R Fischer
(74) *Attorney, Agent, or Firm* — Smith IP Services, P.C.

(57) ABSTRACT

A runflat device, and a method of fitting a runflat device. The runflat device can include a chain of segments which is flexible enough to be manipulated for fitting, while also being laterally stable to ensure correct positioning and to avoid misalignment when tightening onto a wheel. The fitting method initially expands the runflat device within the cavity of the tire, retaining the runflat device securely in place against the inside of the tire's tread area. This advantageously leaves the beads of the tire unobstructed for fitting to a wheel.

14 Claims, 8 Drawing Sheets

(56) References Cited

U.S. PATENT DOCUMENTS

| | | | |
|---|---|---|---|
| 7,040,365 B2 | 5/2006 | Lust | |
| 2002/0096237 A1 | 7/2002 | Burhoe et al. | |
| 2005/0076983 A1* | 4/2005 | Kimura | B60C 17/04 152/158 |
| 2005/0126672 A1* | 6/2005 | Ratet | B60C 17/04 152/520 |
| 2006/0113018 A1 | 6/2006 | Naito et al. | |
| 2009/0107596 A1 | 4/2009 | Palinkas et al. | |
| 2010/0096059 A1 | 4/2010 | Lust | |
| 2011/0248554 A1 | 10/2011 | Chon et al. | |
| 2012/0223569 A1 | 9/2012 | Lust | |
| 2016/0009147 A1 | 1/2016 | Lust | |

FOREIGN PATENT DOCUMENTS

| | | | |
|---|---|---|---|
| WO | WO 01/87646 | * | 11/2001 |
| WO | 2004069564 A1 | | 8/2004 |
| WO | 2010128305 A1 | | 11/2010 |

OTHER PUBLICATIONS

Advisory Action dated Aug. 8, 2017 for U.S. Appl. No. 14/860,176, 6 pages.
Advisory Action dated Aug. 23, 2017 for U.S. Appl. No. 14/860,176, 4 pages.
Office Action dated Mar. 17, 2015 for U.S. Appl. No. 13/138,972, 10 pages.
Office Action dated Jul. 1, 2015 for U.S. Appl. No. 13/138,972, 8 pages.
Written Opinion of the International Preliminary Examining Authority dated Feb. 4, 2015 for International Patent Application No. PCT/GB2014/050485, 7 pages.
International Preliminary Report on Patentability dated May 22, 2015 for International Patent Application No. PCT/GB2014/050485, 14 pages.
International Search Report with Written Opinion dated May 21, 2014 for International Patent Application No. PCT/GB2014/050485, 12 pages.

* cited by examiner

RUNFLAT DEVICE AND FITTING METHOD

CROSS-REFERENCE TO RELATED APPLICATIONS

This application is a national stage under 35 USC 371 of International Application No. PCT/GB2014/050485, filed on 19 Feb. 2014, which claims priority to United Kingdom Application No. 1303023.4, filed on 20 Feb. 2013. The entire disclosures of these prior applications are incorporated herein by this reference.

The invention relates to an improved runflat insert device, and to an improved method of fitting a runflat insert device. Particularly, but not exclusively, the invention relates to a combined runflat insert and double-sided beadlock, and a method of fitting said combined runflat insert and double-sided beadlock within a single-piece drop centre wheel and tyre assembly.

Puncture or deflation of a pneumatic tyre on a vehicle can lead to a loss of support and stability which can render a vehicle un-driveable. Devices that are fixed to a wheel inside a pneumatic tyre cavity to support a deflated tyre are variously known as runflat insert devices. These devices are typically designed and located within the wheel and tyre assembly so that a part of the device rests in the drop-centre or 'well' of the wheel to support the runflat insert device in use.

As well as a loss of support and stability for the vehicle, a tyre deflation whilst a vehicle is in motion can lead to the tyre's beads moving inwards from the wheel rim's seats, resulting in a loss of grip between the wheel rim and the tyre and allowing the tyre to rotate around the wheel rim. Because the tyre is loose on the rim, traction and braking may be compromised and in extreme cases the tyre may begin to flail or even break up. To overcome these problems, it may be desirable to fit the wheel and tyre assembly with a form of beadlock device.

Beadlock devices are devices which are designed to retain a tyre in position on a wheel, typically by applying a force to the tyre's beads to prevent them from slipping against the wheel rim. Beadlock devices are commonly of an annular construction, and are fitted between the tyre's beads within some two-piece or multi-piece wheel rims where the wheel rims may be forced together under pressure when forming the complete wheel in order for the beadlock device to force the tyre's beads into the wheel seats. This provides what is commonly termed 'beadlock', as the lateral force acts on the tyre's beads forcing them hard against the wheel rim's seats or flanges. This effectively locks the tyre's beads in place so they cannot slip on the wheel circumferentially when the vehicle is running in deflated (runflat) situations as described above, or in high torque situations (in high torque situations, typically on heavy vehicles using low gear ratios, a tyre may slip and rotate circumferentially around the wheel rim even while the tyre is fully inflated). Clearly this method of beadlock cannot be used on a single-piece drop-centre wheel rim, because there is no way to force the rims of these types of wheels together.

Other devices are available which are simply fitted within the tyre cavity on any conventional wheel (which may be of two-piece, multi-piece, or single-piece drop-centre type) between the tyre's beads to prevent the beads from slipping inwards. Devices of this style of construction act as bead blocking devices, but cannot provide the industry with the mechanical characteristics they expect of a beadlock because little or no lateral force is applied to the tyre's beads to lock them into the wheel's seats and flanges. If such a bead blocking device is combined with a runflat insert it may provide a support for the deflated tyre to run on whilst preventing the beads from moving inwards on the wheel rim. However, to provide true beadlock in order to prevent a tyre from slipping or rotating around the wheel rim while running inflated or deflated, pressure must be applied to the inside of both beads to force them laterally outwards against the wheel rim's seats and the inner sides of the wheel's flanges, as may be achieved when a beadlock device is fitted to the two-piece or multi-piece wheel rim. It can be seen in current applications that even air pressure within an inflated tyre cavity may provide insufficient force to prevent tyre slippage in high torque situations, so a fairly considerable lateral force is required in some applications to prevent circumferential tyre to wheel slippage.

It is an object of the present invention to provide a combined runflat insert and double-sided beadlock that can be used on a single-piece drop-centre wheel.

To provide true beadlock within a single-piece drop-centre wheel rim the runflat and combined beadlock device must have a mechanism to provide adequate lateral pressure against both beads of the tyre after the device has been located on the wheel rim and between both beads of the tyre.

Combined runflat insert and bead blocking or beadlock devices require that the bead blocking or beadlock components of the device to locate correctly and equally around the circumference of the wheel rim and equally between both beads of the tyre before being tightened on to the wheel rim. If such devices are to be tightened from outside the wheel rim and tyre assembly, a normal tyre fitter will be unable to tell, from outside the tyre cavity, whether or not a runflat device and its components are located securely in the correct position. As such, a method of construction and/or assembly must be devised so that this is achieved automatically when the device is tightened during fitting.

Accordingly, it is a further object of the present invention to provide a runflat insert and a method of fitting a runflat insert that ensures correct seating of the runflat insert on the wheel within the tyre.

The method should prevent components, segments, sections or the complete runflat insert from catching on one side of the inner wall of the tyre or a bead of the tyre that may tip, skew, dislocate or misalign the device in such a way that it is not located precisely between the tyre's beads when being fitted and when finally tightened.

According to the present invention there is provided a runflat device according to the appended claim 1.

A further aspect of the present invention provides a runflat device according to the appended claim 3.

A further aspect of the present invention provides a method of fitting a runflat device according to the appended claim 18.

Further preferred features of the invention are recited in the associated dependent claims.

A runflat device according to the present invention comprises a flexible body with two ends which are joined together by adjustable connection means to form a ring with an adjustable diameter. The adjustable connection means allow the distance between the ends of the flexible body to be adjusted, and comprises one or more rigid elements such that diameter of the ring can be forcibly increased by adjusting the connection means. This allows the runflat device to be forced against the inner wall of a tyre and retained in this position while the tyre is fitted to a wheel. The body should be flexible in a first direction to allow for manipulation during fitting, but is preferably substantially rigid in a second direction, perpendicular to the first direction, to ensure that the body remains aligned during fitting of the runflat device.

The body may formed as a chain of individual segments joined together in abutment with one another.

An alternative runflat device according to the present invention comprises a body formed as a chain of individual segments joined together in abutment with one another. The chain is flexible in a first direction and the ends of the chain are joined together by adjustable connection means, which can adjust the distance between the ends of the chain, to form a ring with an adjustable diameter.

Having segments joined together in abutment with each other avoids individual segments in the chain moving out of alignment as the runflat device is tightened onto a wheel. The segments are preferably pre-formed components, preferably of a plastics material. The chain may be articulated, and remains flexible in a first direction to allow for manipulation during fitting. Preferably, the chain of segments is substantially inflexible in a second direction, perpendicular to the first direction, to ensure that the chain of segments remains aligned during fitting of the runflat device.

The connection means may comprise one or more rigid elements such that diameter of the ring can be forcibly increased by adjusting the connection means, allowing the runflat device to be forced against the inner wall of a tyre and retained in this position while the tyre is fitted to a wheel.

Where a chain of segments is provided, the segments in the chain may be held together and pre-tensioned by tensioning means, for example by one or more cables. The one or more cables may run through guide means provided on the segments making up the chain. The guide means may be provided as separate components fixable to the segments, for example screw in eye-bolts, or as integral parts of the segments, for example moulded features such as hangers.

The connection means may provided on a separate component which is incorporated into the ring. Where a chain of segments is used, the connection means may be provided on a further segment which is incorporated into the ring. The further segment may be similar to the segments making up the chain for ease of manufacture. Indeed, all of the pre-formed segments in the runflat device may be identical in construction.

A connector may be provided at each end of the body for receiving a part of the adjustable connection means. The connectors and connection means may comprise threaded portions, for example the connectors could comprise threaded nuts for receiving threaded rods provided in the adjustable connection means. Preferably, the connection means comprises a gearbox connected to rotatable threaded rods via universal joints. The or each connector may be pivotable relative to the body of the runflat device to account for changes in the angle of the received part, e.g. the threaded rods, of the adjustable connection means.

The runflat device may further comprise an outer sleeve, which fits around a part of the body and is rotatable with respect to the body. In use, the sleeve can rotate relative to the body of the runflat device to reduce friction between a deflated tyre and the body of the runflat device. By fitting round a part of a runflat body made up of a chain of segments, the sleeve also helps to retain the segments in a ring shape. The sleeve may be constructed to help prevent twisting or dislocation of the segments to ensure that the chain of segments remains aligned during fitting of the runflat device.

The runflat device described above, or a similar runflat device comprising a flexible body with two ends, can be fitted according to the invention by the following method:
- coiling the flexible body to a diameter smaller than the interior diameter of a tyre;
- inserting the coiled body into the tyre cavity;
- uncoiling the body within the tyre cavity and connecting the ends of the body with an adjustable connection means to form a ring; and
- expanding the ring with the adjustable connection means to locate the ring against the inside of the tyre.

The method allows the runflat device to be held in place at the outside diameter of the tyre cavity, leaving the beads of the tyre unobstructed for fitting to a wheel.

The method may further comprise the step of fitting an outer sleeve to the flexible body before coiling the flexible body.

The steps above are performed before fitting the tyre to the wheel. After fitting the device to a wheel, the adjustable connector device may then be tightened to tighten the ring and locate the runflat device on the wheel rim in abutment with the beads of the tyre. The adjustable connection means may be positioned adjacent a valve hole provided in the wheel such that the adjustable connection means can be accessed via the valve hole for adjusting the diameter of the ring. After tightening the runflat device into place, the method may then comprise the additional step of further tightening the adjustable connection means to deform the flexible body. This acts to force parts of the segments against the beads of the tyre, locking them to the wheel rim.

A better understanding of the present invention will be obtained from the following detailed description. The description is given by way of example only and makes reference to the accompanying drawings in which.

Figure 1:
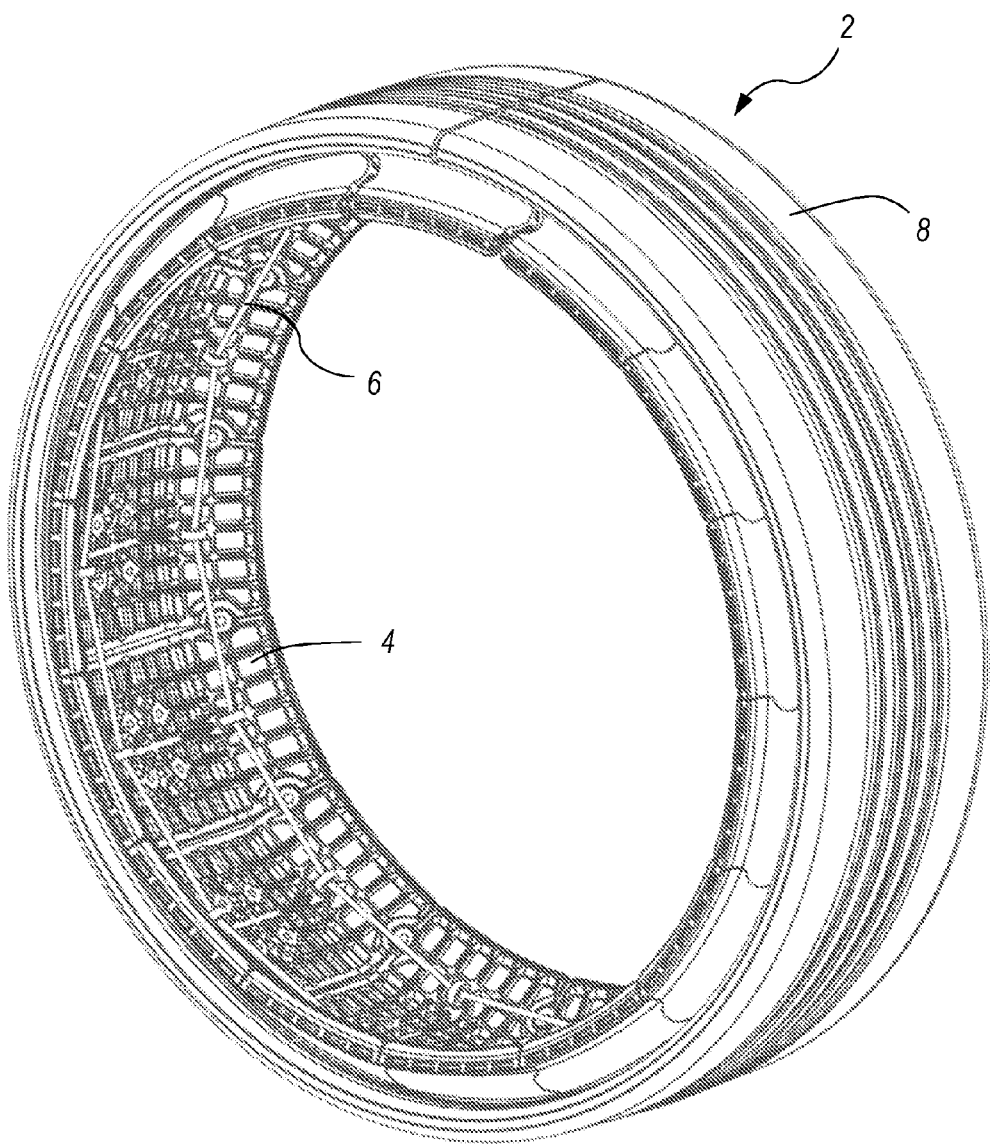
FIG. 1 is a perspective view of a runflat insert device according to the present invention.

FIG. 1 shows a runflat insert device 2 (a runflat) comprising a chain of individual segments 4 connected together by cables 6. The two ends of the chain of segments 4 are then joined together to form a ring as shown in FIG. 1 which, in use, locates within a tyre and rests on the wheel of a vehicle. Each of the individual segments 4 is formed of a plastics material and all of the segments 4 used in the runflat 2 have a common design, as will become clear from the subsequent Figures.

FIG. 1 also shows an outer annular section or friction roller in the form of a sleeve 8 located around the outside of the runflat 2. The sleeve 8 is free to rotate relative to the segments 4 around the circumference of the runflat 2 to provide an anti-friction device between the inside of the tyre tread and the main body of the runflat device 2. The sleeve 8 may be formed from a dissimilar material to that used for the segments 4 to reduce friction between the components, preferably from a different plastics material. Lubrication may also be introduced between the segments 4 and the sleeve 8 to reduce friction further. The sleeve 8 is a single component that slides onto the tops of the segments 4 before the ends of the chain of segments 4 are connected together. It is flexible along its length, to conform to the circular shape of the runflat device, but is relatively rigid laterally.

As well as providing an anti-friction device and improving the lateral stability of the runflat 2, the sleeve 8 also assists in maintaining alignment of the runflat device 2 during fitting, and also helps to distribute forces applied to the device during use, such as from kerb strikes, to minimise the likelihood of damaging an individual segment 4. The sleeve 8 is simple in construction and lighter in weight than known roller devices from known runflat devices, which are often built into the runflat device and incorporate bearings or other moving component parts. This not only minimises the overall weight of the runflat device 2, but also, significantly, minimises the weight of components that move within the flat tyre.

The chain of segments 4 that make up the runflat 2 are joined and tightened together by the cables 6 before the runflat 2 is fitted so the device comprises a single unit, flexible circumferentially but rigid/inflexible laterally. Some known runflat devices comprise a number of individual segments that are 'drawn together' as the runflat device is pulled into place during fitting (for example WO2004/069564). This method has been found to be essentially unusable in practice because it proved almost impossible to pull the individual parts/segments securely into place within the tyre's beads without one or more of the parts/segments catching on the side of the tyre's inner wall, or the tyre's bead, on one side or the other. This prevents the runflat device from seating correctly, causing the device either to come loose in service or fail if run flat. Furthermore, because this misalignment and incorrect seating occurs within the tyre, it is impossible for the fitter to see whether or not the device was seated correctly after fitting, reducing the chances of incorrect fitting being detected and remedied.

The runflat 2 of the present invention is very stable, almost rigid, laterally, and the individual segments 4 are held tightly together prior to fitting. This greatly simplifies the fitting process and avoids the problems of misalignment and of segments catching on the tyre as mentioned above.

Figure 2:
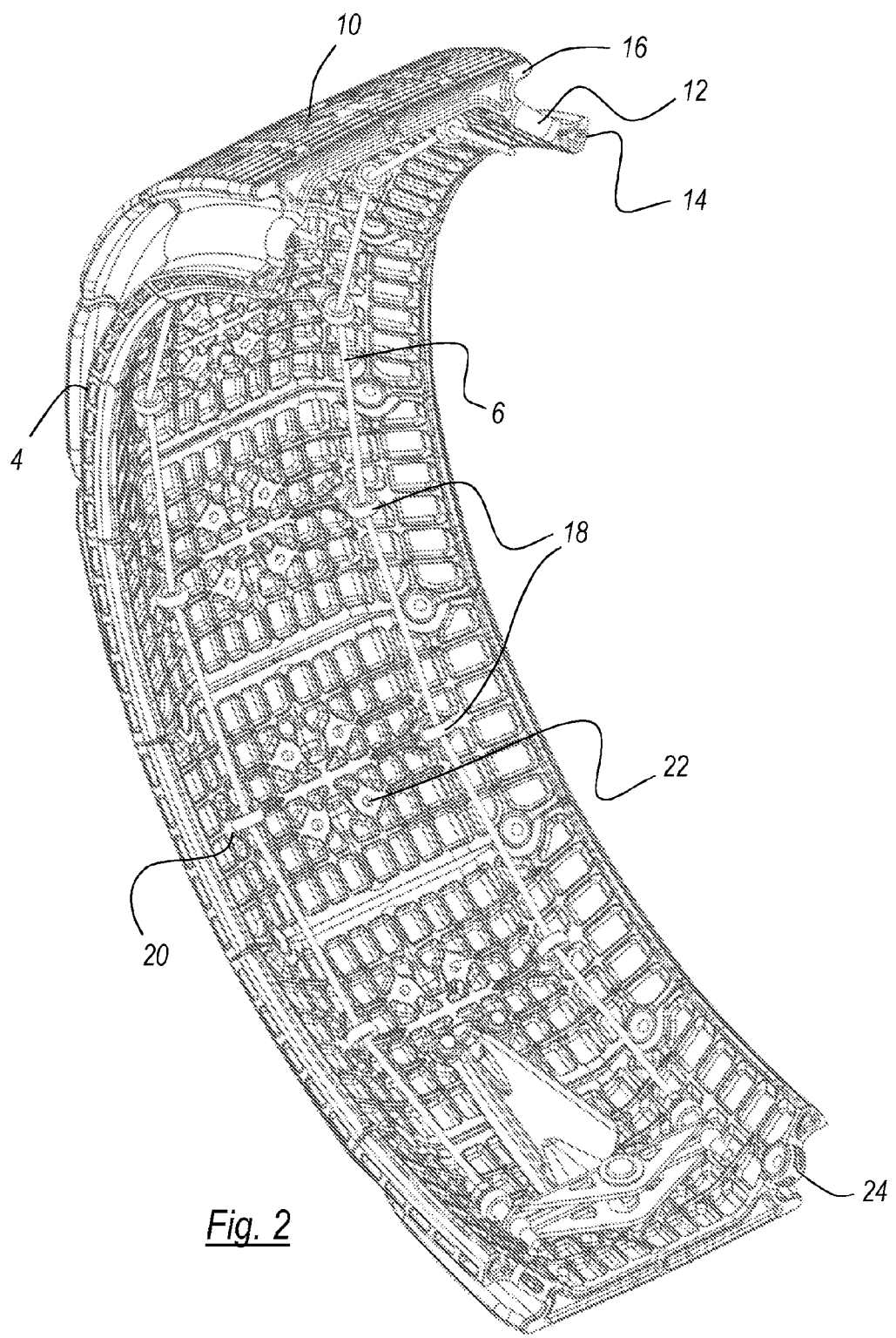
FIG. 2 is a perspective view of a section of the runflat insert device of FIG. 1.

A section of the runflat device 2, with the outer sleeve 8 removed, is shown in greater detail in FIG. 2. Seven individual segments 4 are shown joined together by a pair of cables 6. Each segment has a cantilever-like cross-section with a generally flat top plate 10 and a pair of angled side portions, or legs 12, extending from an underside of the top plate 10. In use, the ends 14 of the legs 12 will rest on the wheel of a vehicle abutting the beads of a tyre. The runflat 2 is thus supported across the width of a wheel without extending into the wheel well. The top plates 10 of a string or chain of segments together make up the outer diameter of the runflat 2 on which the vehicle will rest in the event of a deflation of the tyre. The sides 16 of each top plate extend beyond the top of the legs 12 on both sides of each segment 4 to provide a greater width to the runflat 2 and to provide lips to retain the edges of the sleeve 8.

Small eye bolts 18 are fitted in holes 20 provided in the underside of each segment 4 to carry the cables 6. Two eye bolt holes 20 are provided in each segment, one at either side of the segment 4 at the midpoint of its length. Four further holes 22 are arranged in a generally square configuration at the centre of the underside of each segment 4.

Each segment 4 in the chain shown is hinged in relation to the next segment 4 with typical 'ball and socket' construction. This can be seen from the segments 4 at the two ends of the chain shown in FIG. 2 where the 'ball' components 24 are provided on the legs one end of the segments, and the 'socket' components 26 at the other. The balls 24 and sockets 26 are located approximately half way up the legs 12 of the segments 4, and the legs 12 are angled slightly away from the ball and socket joint towards the top plate 10 and the end 14 of each leg 12. This angle ensures that that sufficient 'flex' between segments 4 is provided so that a string or chain of segments 4, once connected and tensioned together, may be coiled into a diameter which is less than the inner diameter of the tyre (at its beads) so that it can be easily inserted into the tyre cavity before fitting the tyre to the wheel rim, and may also be opened up to the largest diameter tyre circumference required.

To ensure that the increase and decrease of diameter of a chain of segments 4 does not alter the tension in the cables 6, the cables 6 should be located on the centre line circumference of the segments and the hinge or ball and socket joints 24,26. This is achieved by correct positioning and size of the eye bolts 20 used to guide the cables 6.

With correct positioning of the tension cables 6, a string of inter-connected segments 4 may be flexed circumferentially without altering the tension on the cables 6. This allows the segments 4 and the 'ball and socket' joints 24,26 to be held tightly together by pre-tensioning the cables before the runflat 2 is fitted into a tyre cavity. This prevents dislocation of the individual segments 4 during fitting and ensures the runflat device 2 is laterally rigid. This lateral rigidity ensures the complete runflat insert device 2 can only pull down in one piece and into the correct location between the tyre's beads. The sleeve 8 shown in FIG. 1 also further increases the lateral rigidity of the runflat device 2, further assisting in correct location while fitting but retaining the circumferential flexibility necessary.

Figure 3:
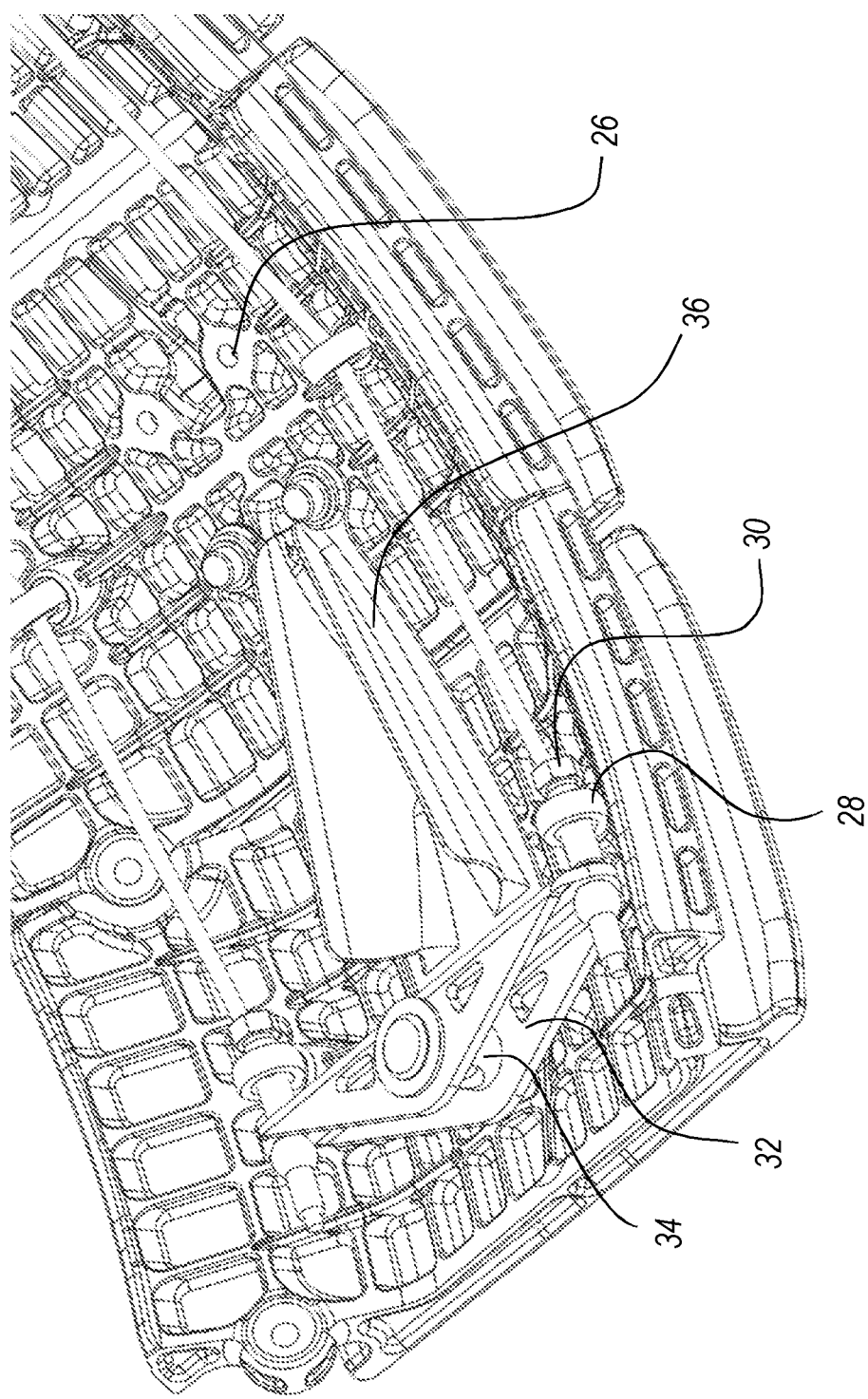
FIG. 3 is a perspective view of one end of the section shown in FIG. 2.

FIG. 3 shows one end of the chain of segments 4 that will make up the body of the runflat device 2. The eye of the eye bolts 28 fixed to the last segment 4 in the chain is threaded to take a hollow adjuster screw 30 fitted in the threaded eye. Adjuster screws 30 may be replaced in an alternative embodiment by any commonly available cable tensioner. The cables 6 are terminated here and the threaded adjusters 30 may be turned to apply the appropriate tension on the cables 6 to firmly hold the string of segments 4 together.

The ends of the tension cables 6 are fixed to a compensating bracket 32 comprising a typical barrel nut 34 for receiving the threaded end of a tension rod 44 (see FIG. 5) which is used to tighten the runflat device 2 onto a wheel. The compensating bracket 32 allows the tension rod 44 to pull the cables 6 with an equalising tension. FIG. 3 also shows an optional guide channel 36 for receiving and guiding the end of the tension rod 44 during tightening of the runflat device 2. The guide channel 36 is attached between two adjacent segments 4 using two of the four central holes 22 from each segment 4.

Figure 4:
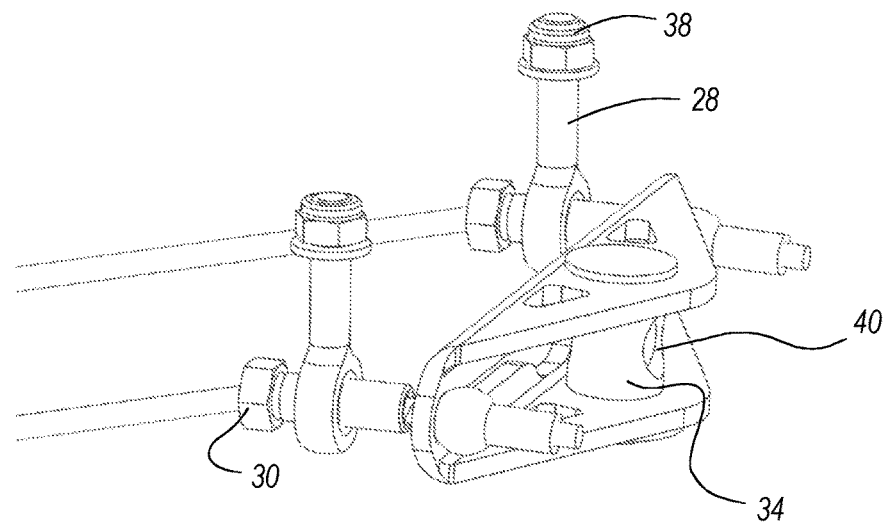
FIG. 4 is a perspective view of a bracket receiving the cables at one end of the runflat insert device.

The bracket 32 is shown in FIG. 4 separated from a segment 4 of the runflat 2. The two eye bolts 28 are provided with threaded fixings 38 for fitting into the eye bolt holes 20 of a segment, and the adjuster screws 30 for adjusting the cables 6 are clearly visible. The barrel nut 38 is provided with a threaded hole 40 for receiving the threaded tension rod 44.

Figure 5:
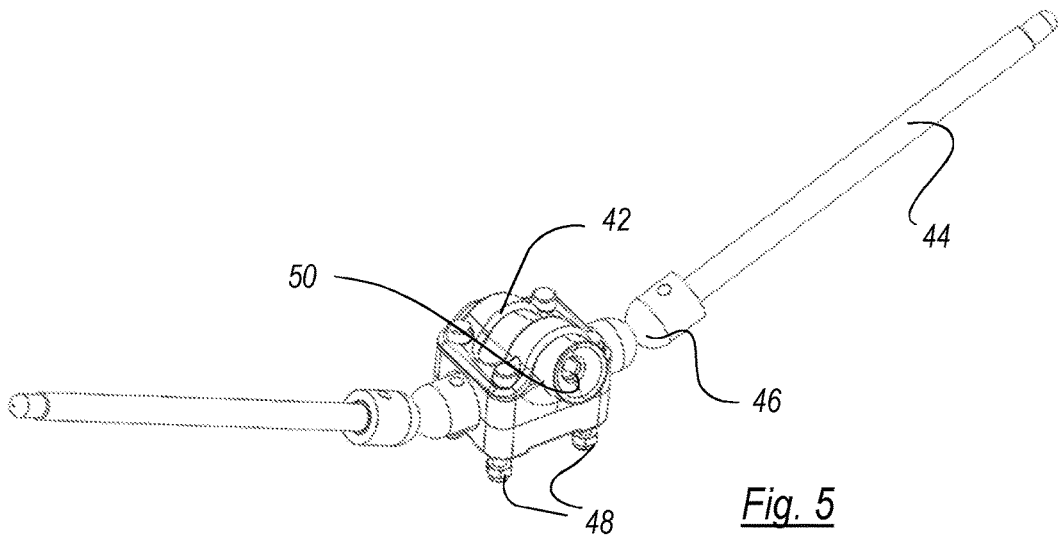
FIG. 5 is a perspective view of a gearbox assembly and threaded rods which form the connection between two ends of the runflat insert device.

FIG. 5 shows a small gearbox assembly 42 from which a pair of threaded tension rods 44 extend. A first end of each tension rod 44 is connected to a proprietary universal joint 46 which itself is connected to an output shaft on each side of the gearbox assembly. The second end of each tension rod 44 is free to be attached to the barrel nut 34 within a compensating bracket 32. A taper is provided on the second end of each threaded tension rod 44 to ease assembly. The gearbox assembly 42 comprises a worm gear which drives a gear fitted on the output shaft. The gearbox assembly 42 additionally comprises four threaded fixings 48 for attaching the gearbox assembly 42 to a segment 4 of the runflat device 2, as shown in FIG. 6.

Figure 6:
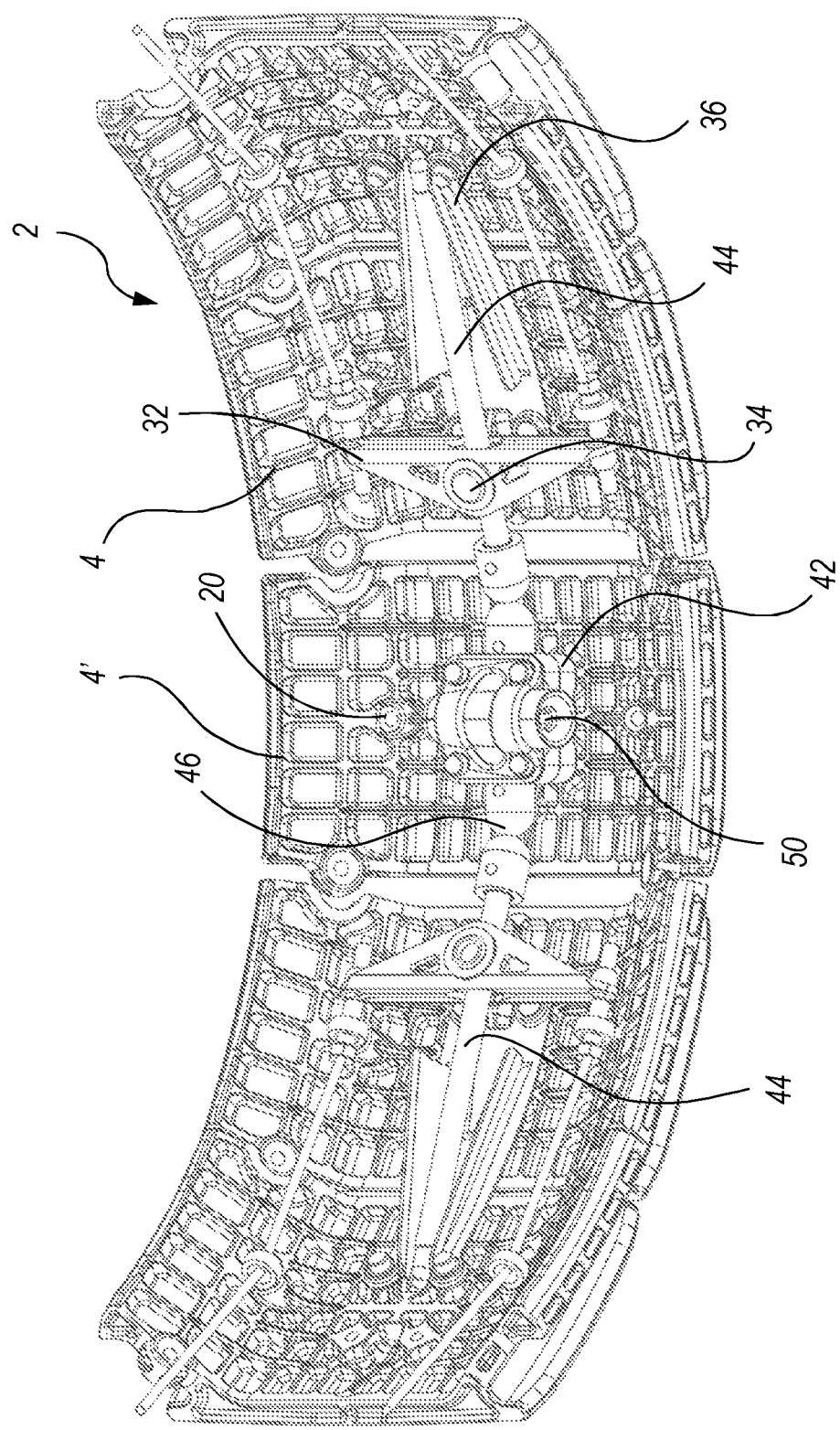
FIG. 6 is a perspective view of the connection between two ends of the runflat insert device.

FIG. 6 shows two ends of the runflat device 2 being joined together. The gearbox assembly 42 is mounted on a further separate segment 4', which may or may not be identical to the segments 4 connected together by cables 6 in the remainder of the runflat device 2. The gearbox assembly 42 is mounted using the central holes 22, so the eye bolt holes 20 of segment 4' are not used. This is clearly visible in FIG. 6. The tension rods 44 are shown threaded through the barrel nuts 34 in the compensating brackets 32 and received in guide channels 36.

In the end of the worm gear is a hexagonal hole 50 into which a proprietary hexagonal tool or Allen key, such as a ball-ended Allen key, may be inserted to turn the worm gear. When the worm gear is turned the output shaft on the gearbox 42 turns and in turn rotates the tension rods 44.

One tension rod 44 and associated barrel nut 34 incorporates a left-handed thread, and the other tension rod 44 and barrel nut 34 incorporate a right-handed thread. When the two tension rods 44 are turned by the gearbox assembly 42 they will either pull the two ends of the cables 6 together or force them apart depending on direction of rotation. The universal joints 46 allow articulation circumferentially of the entire string of connected segments 4, and account for changes in the angle of the tension rods 44 as the circumference of the runflat 2 is increased or decreased. The compensating bracket 32 is not directly fixed to the segment 4, so is able to pivot relative towards or away from the segment 4 about the adjustor screws 30, due to the flexibility of the cables 6, to account for changes in the angles of the tension rods 44.

The tension rods 44 are shown in FIG. 6 having been wound most of the way through the barrel nuts 34 to bring the ends of the runflat 2 close together. However, the tension rods 44 are of sufficient length so that when just connected to the barrel nuts 34 by one or two threads the two ends of the string of segments 4 are wide enough apart that the overall outer diameter of the runflat insert device 2 fits snugly inside and against the inner side of the tyre's tread area, thus filling the outer half of the tyre's inner cavity and leaving the lower or inner half of the tyre's cavity and sidewalls and the tyre's beads un-obstructed. Thus located, the complete runflat device 2 assembly is connected together and held in place within the outer diameter inside the tyre and the tyre may be fitted to the wheel rim in the normal fashion using normal tyre fitter's equipment. Significantly, the entire assembly is held within the tyre ready for final tightening without obstructing the beads of the tyre, which can be easily fitted on to the wheel in the normal way.

The runflat device 2 of the present invention also advantageously provides a lateral pressure to the beads of a tyre to function as a true beadlock device. The legs 12 of the individual segments 4 have a degree of flexibility and are angled outwards from the top plate 10 towards their ends 14 where they will seat on the wheel. When not subject to any supplied force, the segments 4 are dimensioned so that the ends 14 of the legs 12 fit reasonably snugly between a tyre's beads when the runflat device 2 is initially tightened down and fitted. As further circumferential tension is applied through increased tightening, the segments 4 are pulled more tightly on to the wheel rim and the legs 12 of each segment flex laterally outwards so that the ends 14 of the legs 12 of each segment 4 are forced outwards into the tyre's beads. This lateral pressure applied to the beads of the tyre forces the beads into the wheel seats to provide a true 'beadlock'.

When running deflated, the weight of the vehicle is supported by the runflat 2 and this creates a vertical downwards force on the top plate 10 of each segment 4 as the wheel revolves. This force pushes each segment 4 harder into the wheel on which it locates. This downwards force is resisted by the legs 12 of each segment 4 by being transferred into a sideways or lateral force by the flexibility in the legs 12 and into the tyre's beads. Thus, the beadlock force generated when running deflated is greater than the force already achieved when the tension cables 6 were initially tightened. This action when running flat effectively provides an active beadlock, where the greater the weight on the device (and therefore the greater the requirement for beadlock becomes), the more lateral pressure is applied to the tyre's beads and the greater the beadlock effect is generated.

The fitting of the combined runflat and beadlock insert device 2 will now be described. For the purposes of the description, reference is made to a normal single-piece drop-centre wheel rim and pneumatic tyre. However, the device of the present invention is also suitable for fitting to a number of different wheel and tyre combinations. Similarly, the method described could be applied to devices which lack some of the features of the device described above.

Figure 7:
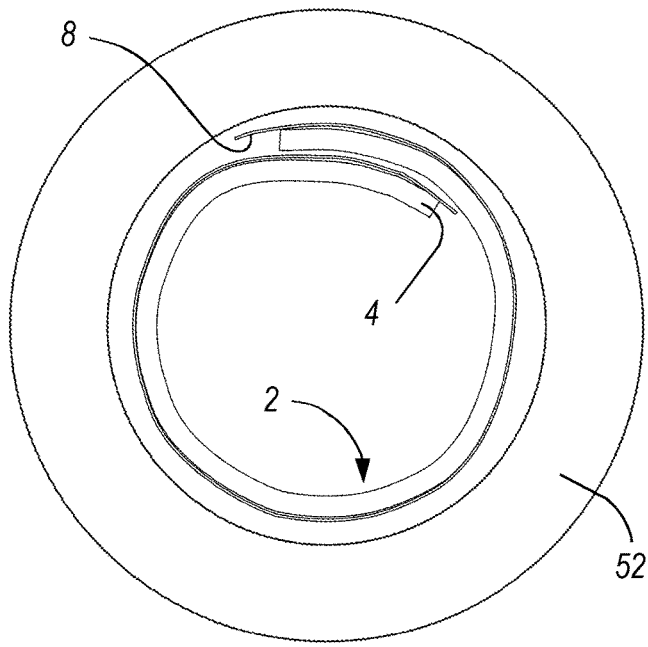
FIGS. 7 and 8 are schematic views of the runflat insert device being installed within a tyre cavity.
Figure 8:
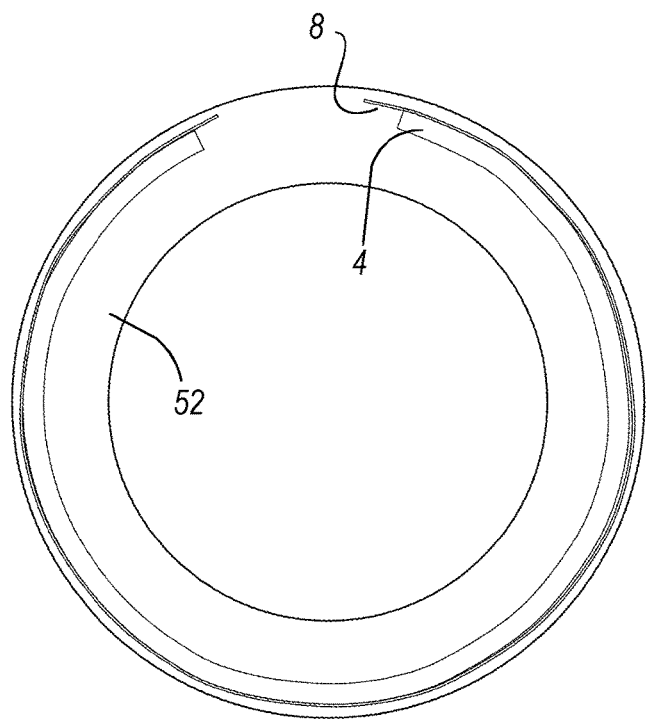

The runflat device 2 is assembled from a string of segments 4 with sleeve 8 fitted to form a single flexible chain. This chain is coiled into a small enough circle so that it fits within the inner diameter of a tyre 52 (i.e. the inner diameter formed by the beads of the tyre). This is shown schematically in FIG. 7. FIG. 7 also shows that the sleeve 8 extends beyond both ends of the chain of segments. The sleeve 8 is longer than the chain of segments 4 by approximately the length of one further segment 4, for reasons which will become apparent. Once inserted into the tyre 52 cavity, the runflat device 2 is then uncoiled to the maximum available diameter so that it fits snugly against the inside of the tyre's tread area, as shown schematically in FIG. 8.

A further individual segment 4', identical to the segments 4 making up the coiled chain, carries the tension rods 44, gearbox assembly 42 and connecting universal joints 46. With the chain of segments 4 arranged as in FIG. 8, this further segment 4' is inserted into the tyre cavity and the free ends of the tension rods 44 are inserted into barrel nuts 34 at each end of the chain.

If the length of the tension rods 44 is too great to allow fitment when the chain of segments 4 is fully extended circumferentially, then the segment 4' with gearbox 42 may be pulled inwards, towards the beads of the tyre, a small distance. The tension rods 44 may be angled upwards via the universal joints 46 such that the distance between the free ends of the tension rods 44 is decreased allowing the tension rods may be inserted in the barrel nuts 34. The compensating brackets 32 can pivot away from the segment 4 as previously described to receive the ends of the threaded tension rods 44. As an alternative, the barrel nut 34 may be arranged rotated 90° from the illustrated embodiment so that the barrel nuts 34 can pivot vertically (towards and away from the segments 4) rather than horizontally. This simplifies the operation and allows greater tightening of the cables 6 prior to this stage to ensure that no segments 4 are dislocated during fitting. A commonly available 'floating' cable tensioner can also be provided to apply and equalize the tension in the cables 6, and this is preferably located opposite the gearbox segment 4' in order to help balance the weight of the gearbox 42.

The input on the gearbox 42 may then be turned using an Allen key to screw the tension rods 44 into the barrel nuts 34 sufficiently to allow the segment 4' with gearbox 42 to be pushed upwards against the inside of the tyre's tread and in line with all the other segments 4 of the chain.

Figure 9:
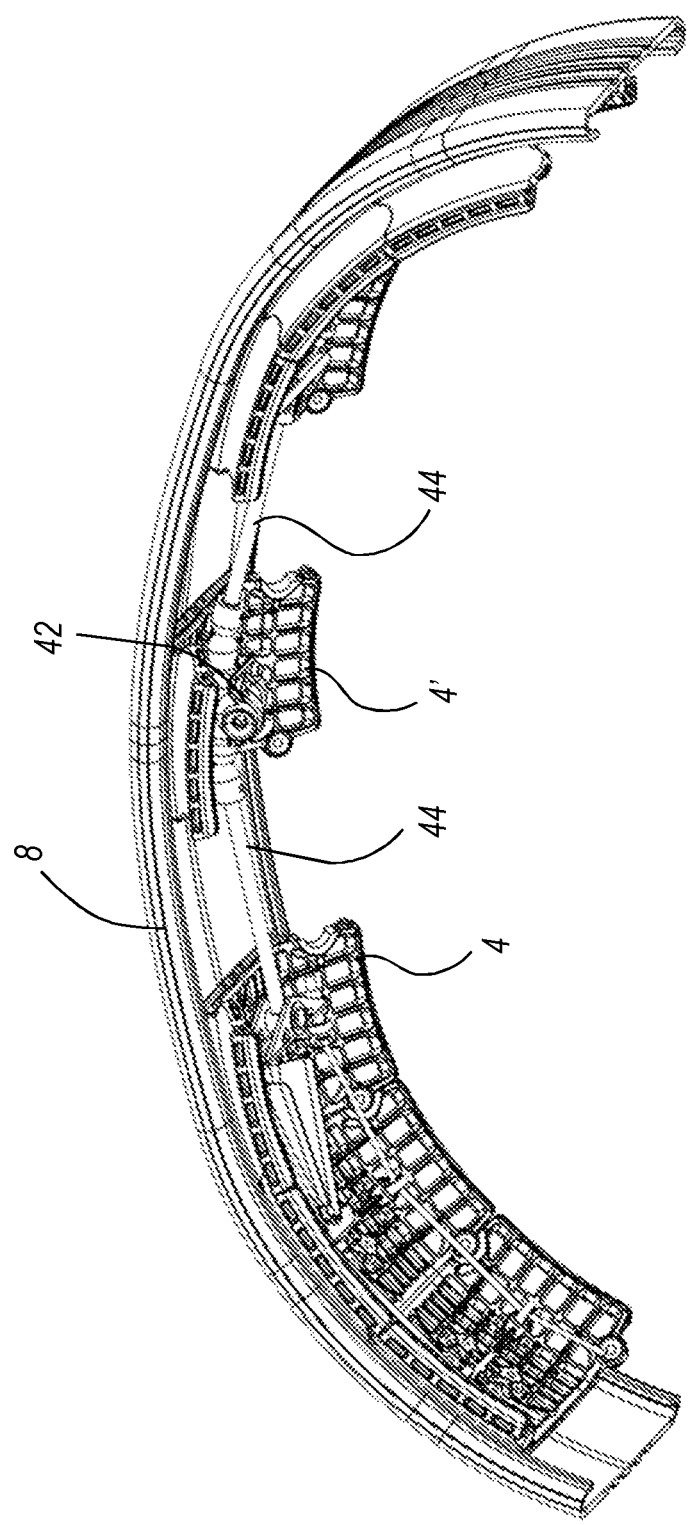
FIG. 9 is a perspective view of a section of the runflat insert device arranged ready for tightening onto a wheel.
Figure 10:
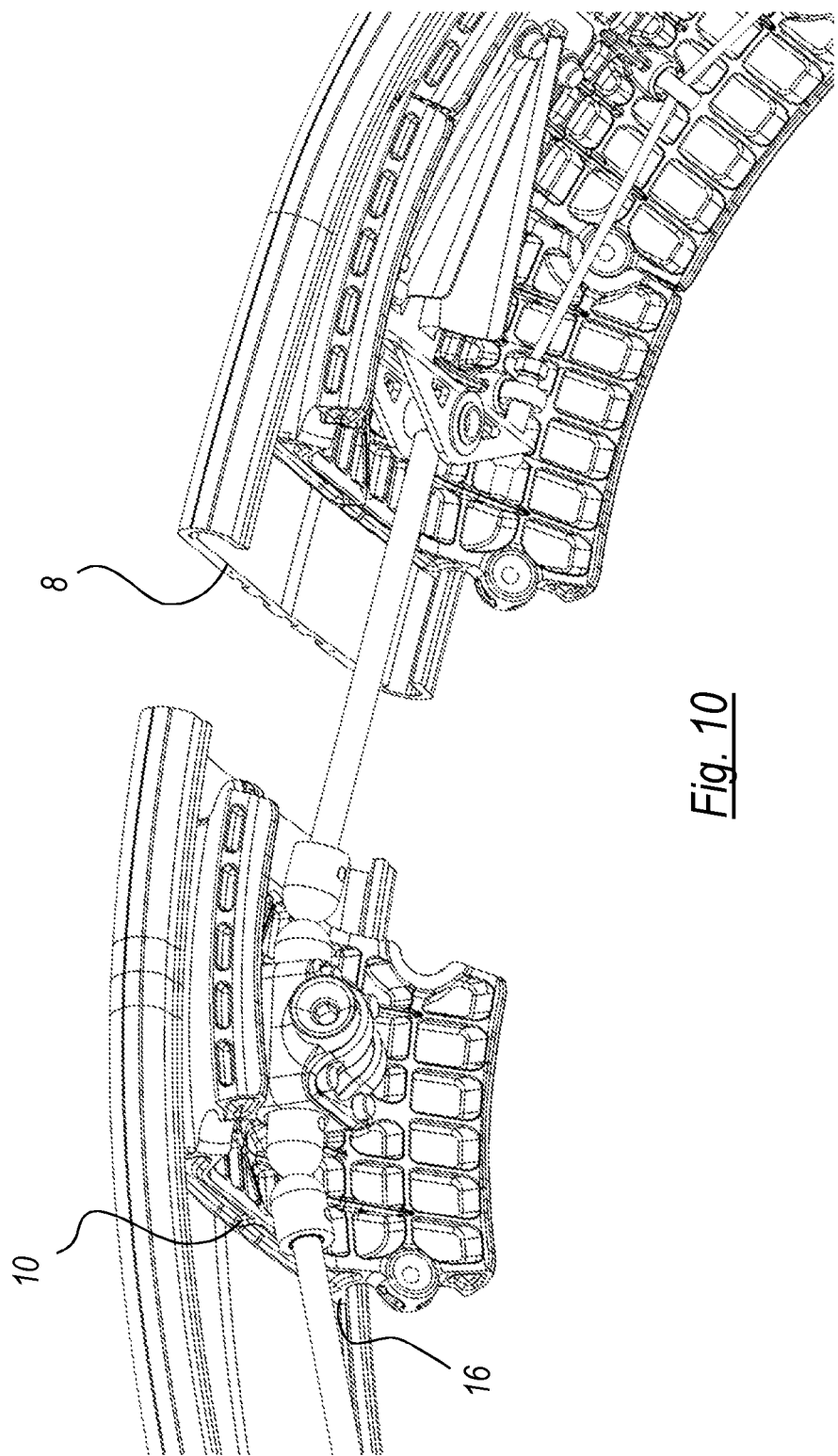
FIG. 10 is a detail view of the connection between two ends of the runflat insert device arranged as in FIG. 9.

At this stage the sleeve 8 is moved circumferentially round the string of connected segments 4 or the string of connected segments 4 is moved circumferentially relative to and within the sleeve 8 so that the two ends of the sleeve 8 are moved away from the area where the segment 4' housing the gearbox 42 is connected. This arrangement, illustrated in FIG. 9, effectively holds the end segments 4 and the gearbox housing segment 4' in line with the main body of the string of segments 4 ready for tightening onto the wheel rim. Because the tension rods 44 are rigid and the segments 4 are pre-tensioned in the chain, the entire runflat device 2 can at this stage be expanded, by turning the gearbox input anti-clockwise, and effectively forced against the inside of the tyre's tread area and held in place there while the beads of the tyre 52, which are unobstructed, are fitted to a wheel. The sleeve 8 in this arrangement additionally helps to hold the segment 4' housing the gearbox 42 radially outward so that it does not move towards the wheel centre as the radius of the runflat device 2 is increased. In the larger view of FIG. 10, a section of the sleeve 8 has been removed to illustrate how the shape of the sleeve effectively wraps around the sides 16 of the top plate 10 of each segment 4,4' to provide resistance against this inward movement.

The inner bead of the tyre 52 is then fitted to the wheel rim in the normal way. The gearbox assembly 42 and its worm drive input are then positioned adjacent to the valve hole of the wheel.

To act as a guide or a retaining device to aid fitting, a fine cable with a screw device on one end is loosely attached to the gearbox assembly 42 or the segment 4' carrying the gearbox assembly 42 and the other end of the cable is passed through the valve hole. This aids fitting by keeping the worm drive adjacent the valve hole and preventing circumferential movement of the device 2 within the tyre cavity when fitting.

A normal metal bolt-on valve is connected inside the tyre cavity and under the runflat device 2 through the valve hole to a normal tyre fitter's 'fishing tool' as used for fitting tubed tyres.

The second or outer bead of the tyre 52 is then fitted to the wheel in the normal way.

The standard metal valve has as a soft rubber washer at its base. The valve is pulled into the valve hole via the 'fishing tool' and its outer collar loosely attached in order to provide enough of a seal via the rubber washer to allow the tyre fitter to inflate and seat both the tyre's beads. The wire used as a locator to the runflat device 2 within the tyre cavity should be sufficiently fine that it can pass around the rubber washer at the base of the valve. The tyre is then inflated in the normal way to seat the tyre beads on the wheel.

The tyre is then deflated and the valve is unscrewed from the valve hole and allowed to drop inside the tyre cavity whilst still being retained by the wire of the fishing tool through the valve hole. The guide or retaining wire may at this point be used to ensure the worm drive is adjacent the valve hole.

At this point, the complete wheel, tyre 52 and runflat device 2 can be made to stand vertically, i.e. as it would be run on the vehicle, so that the runflat device 2 inside the tyre cavity can be more easily pulled into position, i.e. on to the wheel rim between the tyre's beads. Alternatively, the tightening can be performed with the wheel lying flat. When tightened, the runflat device 2 simply slides up the inside of the tyre's wall and into place on the wheel.

A hexagonal drive tool (preferably a ball ended Allen Key) is then inserted through the valve hole to locate in the hexagonal drive 50 in the end of the worm gear of the gearbox 42 and used to apply a prescribed torque, which initially draws the entire runflat device 2 into position, before applying a further prescribed tension to the tension rods 44 and tension cables 6 in order to pull the segments 4 down onto the wheel sufficiently to flex the legs or sides 12 of the segments 4 and push them laterally into the tyre's beads to provide a beadlock force.

The entire assembly of the runflat device 2 is substantially laterally rigid, the rigidity of the pre-tensioned segments 4 being complemented by the sleeve 8, so that when the diameter of the assembly is reduced as the assembly is tightened during fitting the entire assembly can follow the contour of the tyre down and between the tyre's beads without twisting and without any individual segments 4 moving out of alignment. The sleeve 8 also covers corners of the individual segments 4, preventing them from catching on the sides or beads of the tyre and individually twisting or dislocating.

The guide or retaining wire may be unscrewed at this point and pulled out of the valve hole, and the valve pulled into the valve hole from under the runflat device 2 with the tyre fitter's proprietary 'fishing tool' attached, and secured in position in the normal way. Finally, the tyre is inflated and the wheel balanced as usual.

The invention described above thus provides:
A combined runflat and beadlock insert device comprising a plurality of part-annular components or segments already fitted and tensioned together to allow the entire device to be pulled down between the tyre's beads without the risk of any misalignment of any individual components catching on the inside of the tyre's walls or beads and not seating correctly between the tyre's beads when finally tightened on to the wheel rim;
A mechanism to function so that after the device is located between the tyre's beads, further tightening or tensioning forces legs or side parts of the segments outwards and into the tyre's beads to apply sufficient lateral pressure to the beads to provide a beadlock;
An 'active beadlock' function whereby a load applied to the runflat device during use causes increased lateral pressure on a tyre's beads; and
A construction and method of fitting to allow a single-piece laterally rigid runflat and beadlock device to be inserted and held within the tyre cavity so as not to obstruct the tyre's beads to enable the tyre fitter to fit the tyre to a normal single-piece drop-centre wheel rim using normal tyre fitting equipment.

The invention is not considered to be limited to the configurations and materials described above. The configuration of the structure as well as the dimensions and, to a certain extent, the material of the component parts would be dependent on a specific application.

For example, the segments 4,4' shown in the application are wide and flat, and are suitable for a low profile road tyre. Similar segments 4,4' for use within an off-road tyre would typically need to be taller and possibly narrower, but would otherwise share many of the features and characteristics described above.

As described, the segments 4,4' have a common design for ease of production/manufacture. Differing wheel sizes can be accommodated by varying the number of segments 4 making up the chain. It is however considered that smaller or larger segments could be provided for use with very small or very large diameter wheels, or in combination with the standard segments to account for unusual wheel diameters if required.

The invention claimed is:

1. A runflat device for a wheel comprising a tyre, the device comprising:
    a flexible body with two ends, the ends of the body being joined together by an adjustable connection means, which adjusts a distance between the ends of the flexible body, and thereby forms a ring with an adjustable diameter,
    wherein the connection means comprises one or more rigid elements, the diameter of the ring being forcibly increased by adjustment of the connection means, wherein the increased diameter locates the ring against an inside of a tread area of the tyre,
    wherein the body is formed as a chain of individual segments joined together in abutment with one another,
    wherein the segments in the chain are held together and pre-tensioned by a tensioning means,
    wherein the tensioning means comprises one or more cables,
    wherein the one or more cables run through guide means provided on the segments making up the chain, and
    wherein the guide means are provided as separate components fixable to the segments.

2. A runflat device according to claim 1, wherein the connection means is provided on a separate component which is incorporated into the ring.

3. A runflat device according to claim 1, wherein the connection means is provided on one of the segments of the ring.

4. A runflat device according to claim 3, wherein all of the segments are substantially identical.

5. A runflat device according to claim 1, wherein a connector is provided at an end of the body and receives a part of the connection means.

6. A runflat device according to claim 5, wherein the connector is pivotable relative to the body.

7. A runflat device according to claim 1, wherein the body is substantially inflexible in a second direction perpendicular to the first direction.

8. A runflat device according to claim 1, further comprising an outer sleeve, which fits around a part of the body and is rotatable with respect to the body.

9. A runflat device according to claim 1, wherein the connection means tightens the ring and thereby locates the runflat device on the wheel.

10. A method of fitting a runflat device comprising a flexible body having two ends, the method comprising the steps of:
    providing the flexible body formed as a chain of individual segments joined together in abutment with one another, the chain being flexible, and ends of the chain being joined together by the adjustable connection means, which adjusts a distance between the ends of the chain, and thereby forms the ring with the body diameter being adjustable, wherein the adjustable connection means comprises one or more rigid elements, the diameter of the ring being forcibly increased by adjustment of the connection means, wherein the increased diameter locates the ring against an inside of a tread area of a tyre, wherein the body is formed as a chain of individual segments joined together in abutment with one another, wherein the segments in the chain are held together and pre-tensioned by a tensioning means, wherein the tensioning means comprises one or more cables, wherein the one or more cables run through guide means provided on the segments making up the chain, and wherein the guide means are provided as separate components fixable to the segments;
    coiling the flexible body to a diameter smaller than an interior diameter of the tyre;
    inserting the coiled body into a cavity of the tyre;
    uncoiling the body within the tyre cavity and connecting the ends of the body with an adjustable connection means, thereby forming a ring; and
    expanding the ring with the adjustable connection means, thereby locating the ring against the inside of the tread area of the tyre.

11. A method of fitting a runflat device according to claim 10, further comprising the step of fitting an outer sleeve to the flexible body before coiling the flexible body.

12. A method of fitting a runflat device according to claim 10, further comprising the step of fitting the tyre to a wheel after expanding the ring, and subsequently tightening the adjustable connection means, thereby tightening the ring and locating the runflat device on the wheel in abutment with beads of the tyre.

13. A method of fitting a runflat device according to claim 12, further comprising the steps of positioning the adjustable connection means adjacent a valve hole in the wheel, and accessing the adjustable connection means via the valve hole.

14. A method of fitting a runflat device according to claim 13, comprising the additional step of further tightening the adjustable connection means, thereby deforming the flexible body and forcing parts of the flexible body against the beads of the tyre.

* * * * *